Sept. 25, 1934.  C. HARRIS  1,974,849
LUBRICATING DEVICE
Filed Oct. 22, 1932  2 Sheets-Sheet 2
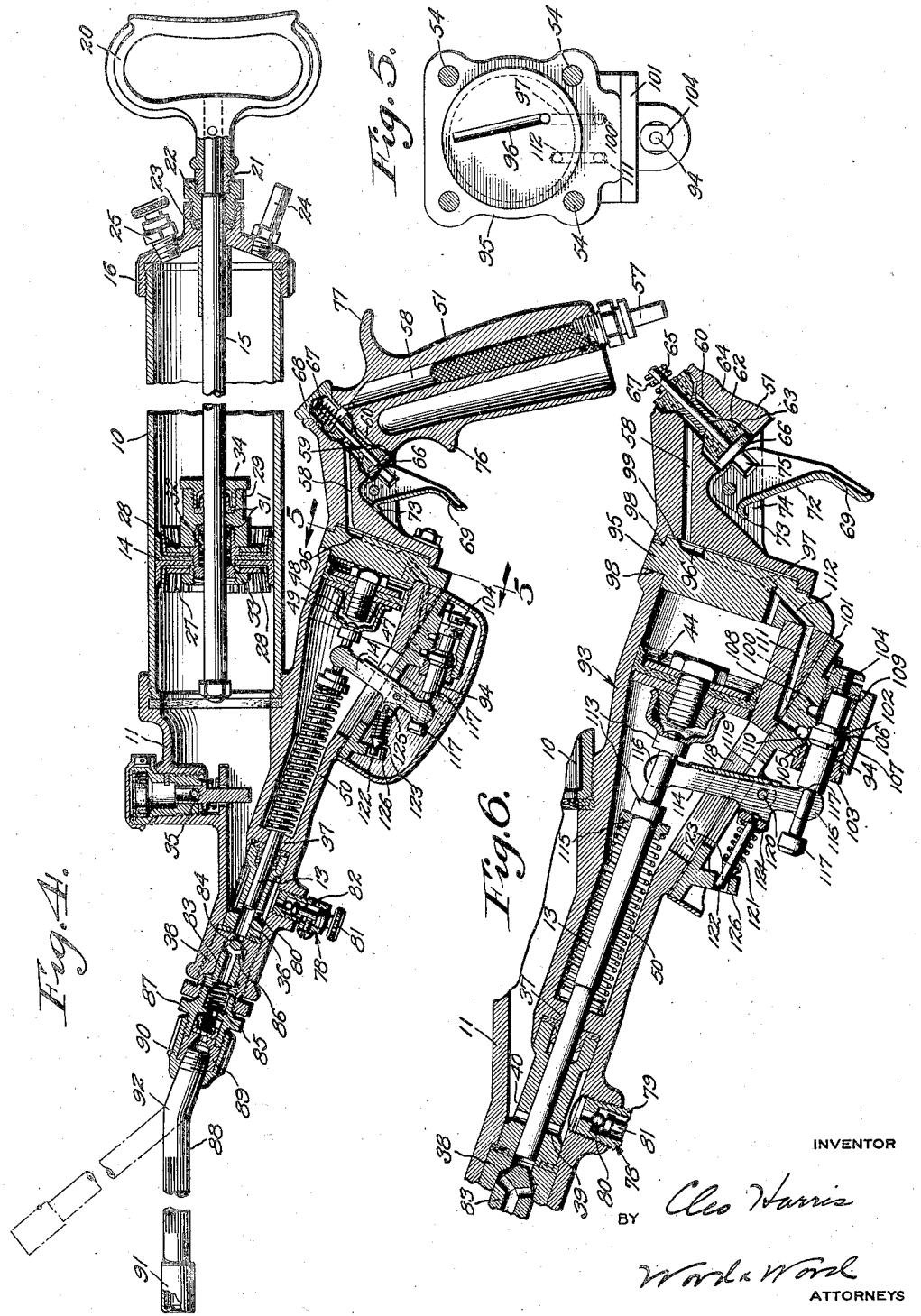
INVENTOR
Cleo Harris
BY
Wood & Wood
ATTORNEYS Patented Sept. 25, 1934

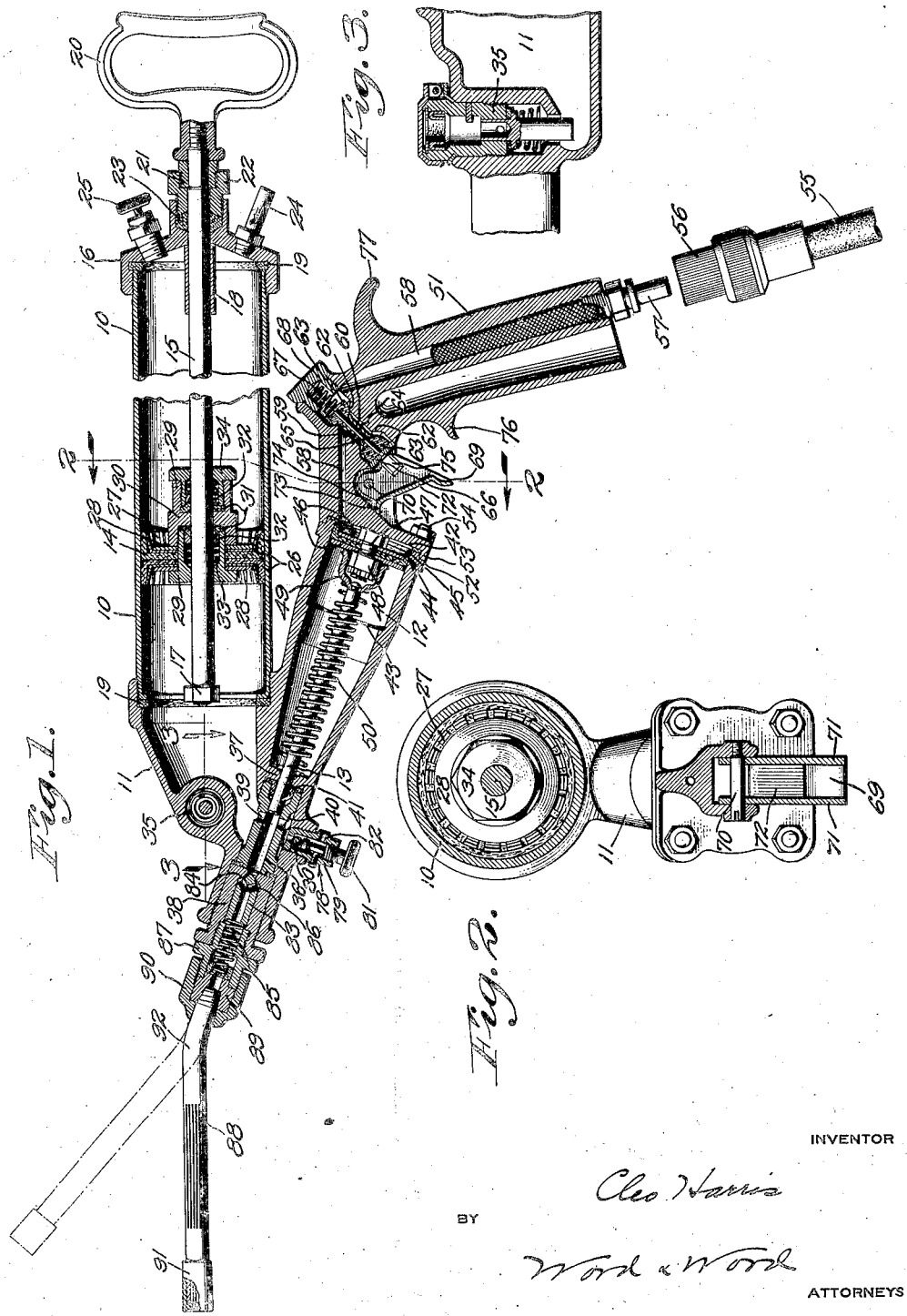

1,974,849

UNITED STATES PATENT OFFICE 1,974,849

LUBRICATING DEVICE

Cleo Harris, Cincinnati, Ohio, assignor to The Cincinnati Ball Crank Company, Cincinnati, Ohio, a corporation of Ohio Application October 22, 1932, Serial No. 639,065

10 Claims. (Cl. 221—47.4)

This invention relates to lubricating apparatus and is particularly directed to a grease discharge gun especially adaptable for discharging the grease to the points to be lubricated through contact connection to the butt or push-on type of fitting. In the art of lubrication there are two types of fittings in current use, one of which is formed with a generally convex or tapered end against which the discharge nozzle of the gun is butted or pushed for a sealing contact induced by physical force applied on the gun and the other of which is known as a pin fitting or hook-on type of fitting which includes structure cooperating with mechanical coupling or hooking means at the end of the gun nozzle. Although the general features of the present improvement are related to a gun which has utility primarily for high pressure discharge of grease to the butt or push-on type of connection or fittings, certain other features of improvement are included in the gun which are of extreme value for use in connection with any type of fitting.

The objects of this invention are: to provide a high pressure lubricant discharge gun by means of which a seal of maximum efficiency may be accomplished in the abutment of the gun nozzle with the butt or push-on type of fitting through the provision of means adaptable for permitting the operator to apply body pressure against the gun in lieu of hand pressure; to provide that the pressure or physical force applied on the gun is applied in substantial alignment with the nozzle; to provide that the forward end of the high pressure discharge gun is tapered to a nozzle point generally so as to enable the operator to conveniently insert the gun into tight or close quarters for efficient application to those fittings which may be ordinarily inaccessible or difficult to reach and in this way to provide a good reach for the gun; to provide that the discharge end of the gun is conveniently adjustable to permit for lateral adjustment of the discharge end relative to the gun which may then be set in any desired fixed position; to provide a balanced high pressure lubricant discharge gun which includes a supply chamber of sufficient capacity for normal service; to provide that the application of body pressure is entirely independent of the discharge control manipulation and therefore in no way interferes with the convenient control of the lubricant discharge; to provide that the handles for control and for applying sealing force on the gun are co-related for balance and consequently ease in transporting the gun; and to provide for interchangeability of the air service hose between the supply chamber and the power or discharge chamber, whereby the operator may build up the pressure in the supply chamber and then utilize the same service hose for coupling to the power side of the gun.

Other objects and further advantages will be more fully apparent from a description of the accompanying drawings, in which:

Figure 1 is a sectional view taken longitudinally and centrally of the improved grease gun for single grease shot control.

Figure 2 is a sectional view taken on line 2—2, Figure 1, detailing the follower piston in the grease supply chamber and the power control trigger for the single shot piston.

Figure 3 is a sectional view taken on line 3—3, Figure 1, detailing the filler valve for the gun.

Figure 4 is a sectional view taken longitudinally and centrally of a modified form of the grease gun for continuous high pressure grease discharge.

Figure 5 is a sectional view taken on line 5—5, Figure 4, detailing the air supply passageways at the air motor for the gun of Figure 4.

Figure 6 is an enlarged fragmentary sectional view, detailing the air motor and control therefor.

The grease guns of this invention include, in both forms, a grease supply chamber and grease feeding or low pressure forcing means therein, a high pressure grease chamber and a discharging piston therein, an operating or power device for said high pressure piston, a discharge nozzle, and gun applying and handling elements. In one instance the operating means is for single stroke control and in the other it is for continuous operation.

The general arrangement of these parts is such as to provide for full balance, efficient application of the nozzle to the fitting by the provision of adjustment for the nozzle and the proper application and alignment of the push-on or butting forces which are applied by shoulder or body pressure on the gun procuring the force necessary to efficiently butt the nozzle against the fitting.

Referring specifically to Figures 1 to 3 of the drawings, the main grease supply chamber is constituted by a cylinder generally indicated at 10. A main power cylinder casting 11 forms the forward end of the supply chamber and supports the barrel or cylinder 10, the power cylinder 12 of this casting extending angularly and rearwardly in relation to the axis of the supply cylinder. The grease supply chamber is inclusive of parts for imparting a low pressure forcing or feeding pressure to the grease for directing it into the region ahead of a high pressure piston 13.

An air actuated follower piston 14 is mounted within the cylinder 10 and moves on an axially disposed rod 15. Normally the rod 15 is supported against longitudinal movement in either direction in the rear head 16 of the cylinder 10. This rod has a nut 17 on its inner end which functions as a stop for limiting forward or feeding movement of the follower piston 14. A sleeve 18, disposed on the rod and lying against the inner side of the head 16, is abutted by the piston when the gun is fully loaded and thereby limits the filling movement of the piston.

The cylinder 10 is screwed into the bore of the casting 11, which constitutes the forward head thereof, and the head 16 is screwed onto the outer end of the cylinder. A sealing ring 19 is mounted between each head and the cylinder. The rod 15 has a shoulder or force applying pad or stock 20 fixed on its extended end by screw threading. This pad or stock includes a relatively flat contact surface adapted for engagement by the shoulder of the operator. The stock has screw threads on its shank 21 for screwing and attaching the same into the outer end of a packing gland 22 which secures packing 23 about the rod preventing leakage along the slidable rod. This screw threaded connection for the pad prevents longitudinal displacement when the gun is in use and is readily disconnectible when it is desired to fill the gun barrel by unscrewing the barrel from the head 11 and placing the open end thereof in a grease drum and therefore pulling the piston back by engagement of the stop 17 against the piston as the rod is drawn outwardly through the rear head 16. When the piston abuts the hub 18, the gun barrel is full and the rod is shoved through the piston and screwed into the head 16. The brace is then solidly and rigidly mounted in the head 16 for application of body pressure thereagainst. The pad is open for purposes of manipulation so that the fingers or hand may be inserted through the same as when the gun is carried on the rod 15 translated. An air filler valve 24, for introduction of air under pressure in back of the follower plate or piston, and a safety or air relief valve 25 are screwed into the head 16. Preferably the filler valve is of the type receiving the air hose by pressure application rather than the coupling type since the hose can be quickly attached and detached.

The follower piston 14 is sectional and is fabricated for sealing engagement with the rod and cylinder wall. A pair of oppositely facing gaskets 26 engage the cylinder wall and are held together by means of expanding plates 27 and discs 28 urged together by means of screw-attached hub sections 29 one at each side of the gaskets and about the rod.

One of these hub sections includes an intermediate partition 30 and oppositely facing gaskets 31, in sealing engagement with the rod, are held against the respective sides of the partition by means of plates 32 and springs 33. A spring retainer 34, in the instance of one gasket 31, is screwed into the hub section 29 and includes a closed spring retaining bore. The other spring is retained in a closed bore of the other hub section.

In addition to the previously described filling method, the grease may be loaded into the gun in front of the follower plate by way of a filler valve 35 located in the casting 11, which valve has been fully described and claimed in the co-pending application of Clyde G. Butler, filed April 13, 1931, Serial No. 529,644. As the grease is packed into the gun from the front, the follower plate is moved back on the rod against the rear stop 18. If it is necessary to relieve the air pressure in back of the follower plate, this may be done through the relief valve at the time of filling. After the supply cylinder is thus filled, compressed air is supplied in back of the follower plate through the air valve and the gun is fully loaded and functioning for supplying the grease to the power or high pressure piston.

The main power cylinder casting 11, as previously described, has the power cylinder 12 disposed rearwardly at an angle to the supply cylinder. The supply cylinder communicates through this casting with a high pressure cylinder 36 disposed in axial alignment with the power cylinder and in front thereof, these cylinders being separated by means of a partition 37 formed as a part of the casting and slidably mounting the high pressure piston 13.

The high pressure cylinder 36, in the form of an insertable element, is inserted in the forward end of the casting through the bore thereof and held in place against the partition 37 by means of a sleeve or valve carrier 38. The high pressure cylinder is in communication with the supply chamber through radial apertures 39 disposed between the bore thereof and an annular groove 40 in the outer face of the cylinder, this groove permitting the grease to pass entirely around the cylinder and enter from both sides.

A packing 41 is inserted between the high pressure cylinder and the partition or wall 37 and seals the high pressure piston for a sliding fit through this wall. The power piston is mounted for air actuation on the power stroke and spring actuation on the return stroke. Its limits of movement are defined by the rear head 42 of the cylinder for the return stroke and by an internal shoulder 43 of the power cylinder bore for the forward or power stroke. The power piston 44 is fabricated of a gasket 45 held between two plates 46 by means of a central bolt 47 and nut 48, the packing being disposed for sealing at the air or rear side of the piston.

The high pressure piston 13 is in connection with the power piston 44 by means of a cup 49 riveted to the inner end of the high pressure piston. This cup is disposed about the nut 48 of the power piston 44 and lies against the forward face thereof. A spring 50 is mounted under compression between the wall or partition 37 and the cup 49 and constantly urges the high pressure piston against the power piston.

The power cylinder head 42 is provided as a part of the control handle or grip 51 for the gun, which handle in its relation to the power cylinder resembles the butt of a pistol. Cooperating adjacent flanges 52, 53 on the cylinder and the head portion of the grip or handle are rigidly fastened together by means of bolts 54.

A source of air supply is connected to the butt of the handle in the form of an air hose 55 having a quick detachable coupling 56 cooperating with a nipple 57 screwed into the handle. An air passageway 58 extends through the handle from this nipple and enters the rear end of the power cylinder. A trigger operated double acting control valve 59 is mounted in the passageway 58 for controlling the inlet and exhaust of compressed air from the power cylinder. It will be noted that the power piston 44 in its fully retracted position does not lie against the rear end of the cylinder but is spaced therefrom by means of the bolt head so that the compressed air has an opportunity to spread quickly in back of the piston for action on the entire area of the piston.

For the purpose of mounting the control valve 59, a bore 60 is provided in the handle, which bore intersects the air passageway. This bore has oppositely facing valve seats 62—62 formed therein. The valve comprises spaced apart seating elements 63—63 of convex form and of leather or a yieldable material. The elements 63—63 are oppositely related and adapted to cooperate with the valve seats 62—62 of the bore. They are held together against a spacer sleeve 64 by means of a central rod 65 having a lower head 66 engaging against the lower seating element and including a spring 67 under compression about the rod and against the upper seat element. The spring 67 is held in place by means of a spring retaining element 68 screwed into the upper end of the bore.

The upper valve seat 62 is located directly in the air passageway to the power cylinder and when its valve element 63 is seated thereon, the air passageway is blocked. Normally the spring 67 under compression maintains the upper valve seat in this position for cutting off air flow. The head end 66 of the rod 65 is loosely slidably mounted in the valve mounting bore and the exhaust from the power cylinder is free to pass by this head and to the atmosphere when the upper or inlet valve is seated since at this time the lower valve is unseated.

The trigger 69 for actuating the valve is pivoted on a pin 70 transversely disposed in the connecting rib between the cylinder head portion and the butt of the handle. The trigger includes side flanges 71 and a forward contact wall 72 which is formed for convenient engagement by the forefinger. Spring induced movement of the trigger 69 is limited by engagement of the forward tip 73 of the trigger with the wall of the recess 74 in which the trigger is mounted. The rear end of the trigger includes contact portions 75 abutting the head of the trigger valve for operation thereof. The handle just behind the trigger includes a flange 76 defining a finger receiving recess and another flange 77 forms a guard at the top of the rear side of the handle.

A relief or bleeder valve 78 is screwed into the casting adjacent the annular groove 40 of the high pressure cylinder 36 and enters the space provided thereby. This valve includes a valve body 79, a ball valve 80 and a screw actuated ball valve operating element 81 for setting the ball valve in closed position or releasing the ball valve to permit relief of air in the event that it pockets about the high pressure cylinder. Discharge flow from the valve 78 takes place through an orifice 82 in the valve body.

The discharge control valve 83 for the gun is of tapered form and is held in position against a tapered seat 84 formed in the valve support element 38 previously mentioned. The valve is held against the seat by means of a spring 85 under compression and is of tubular form except for a solid seating head. Beyond the seating portion of the valve discharge ports 86 enter the interior bore of the valve permitting grease flow through the outer open end of the bore. A nipple 87 is screwed into this valve carrier or support 38.

The nozzle 88 for the gun carries an attaching adapter or abutment element 89 fixed on its inner end, which element 89 is held against the nipple 87 and against the spring 85 by means of a ferrule or union element 90, loosely mounted on the nozzle, engaged over the element 89 of the nozzle and screwed on the nipple.

The nozzle, formed of pipe, includes a discharge head 91 at its outer end which is of concave shape for abutment with the convex head of the conventional push-on or butt fitting, the discharge bore extending through this head. The nozzle is bent adjacent its inner end as at 92 so as to provide for substantial axial alignment of the nozzle with the supply cylinder of the gun for the purpose of applying gun nozzle butting pressures. The clamping ferrule of the gun is easily unscrewed for swinging the nozzle to change the direction or alter alignment thereof depending on the position of the fitting being lubricated.

In the form of gun disclosed in Figures 4 to 6 inclusive, a continuous type of high pressure grease discharge apparatus is disclosed. In this form an air motor 93 is provided, whereby reciprocation of the piston continues as long as the trigger is held down and the air permitted to flow to the air motor. The general structure of the second form of gun is the same as the first with the exception of some modifications at the power piston, wherein the cylinder thereof is designed to include a piston reversing air control valve 94 and the proper arrangement of air passageways.

As shown in the detailed views, a plate 95 is inserted between the cylinder and the cylinder head 42, this plate being grooved and drilled in the following manner and for the following purposes:

The air passageway 58 extends through the handle 51 to the inner side of the cylinder head in the same manner as in the preceding form of gun. The plate (see Figure 5) includes a groove 96 disposed across its surface and extending from communication with the air passageway 58 of the handle to the lower side of the plate, where it joins a drilled hole 97 extending diagonally through the plate to a forward sealed edge of the plate.

The plate 95 is marginally grooved as at 98 on its inner and outer sides so as to fit on the inner side into the bore of the cylinder and on the outer side into a recess 99 of the head. The drilled air passageway 97 previously mentioned communicates with a passageway 100 extending longitudinally of the wall of the cylinder and passing out of the lower side thereof. A valve carrier or plate 101 is fixed to the underside of the cylinder and mounts the reversing valve which is disposed in a bore of the plate in parallelism with the power piston 44 and cylinder 12. This valve includes oppositely facing contact or seating shoulders 102 formed by the inclined sides of an enlarged portion of the valve.

The valve 94 is slidably mounted in a bushing or sleeve 103, screwed into the bore of the plate at one side of the valve contact portion, and in the opposite end of the bore by means of a slidable head 104 fixed to the end of the valve. The opposite shoulders formed by the intermediate portion of the valve respectively engage inclined valve seats 105, 106, one of which is formed on the inner end of the bushing and the other of which is formed in a partition or wall 107 in the bore of the plate.

The air inlet passageway 100 leading out of the wall of the cylinder enters a passageway 108 which communicates with the bore of the valve plate between the partition 107 and a packing 109, carried by the valve, sealing the rear end of the valve, the bore at this point being large enough for clearance entirely around the valve. When the valve is seated against the partition, the air inflow is blocked and the valve is held in seated position by the air pressure in the bore portion acting against the packing 109 carried by the valve. When the valve is moved from the seat 106 on the partition 107 to the opposite seat 105, the air supply then passes through the bore of the partition into an enlarged bore around the enlarged shoulder portion of the valve through a passageway 110 in the plate to the wall of the cylinder, then through a continuation 111 of the passageway along the cylinder wall to the grooved plate 95, thence through the passageway 112 in the plate into the cylinder in back of the power piston.

After the power stroke of the piston and reversal of the valve, the valve again seats on the partition and the air in back of the power piston is driven out by the spring induced return of the piston and exhausts by way of the bore of the bushing 103 along the valve body. At the time when the air is being supplied to the power cylinder, the valve is held seated for cutting off the exhaust by the air pressure coming in through the supply line.

The reversing valve is actuated by the movement of the power piston and plunger. For this purpose a pair of collars 113 are spaced apart on the high pressure plunger adjacent the piston, the opposing shoulders thus formed alternately engaging the inner end of a trip lever 114. The return spring 50 of the power piston and plunger is mounted between a spring retainer 115 lying against the outer collar 113 and the partition 37 toward the outer end of the plunger. The trip lever straddles the plunger rod between the shoulders and includes circular ends 116 for rolling contact with the abutment collars 113.

The opposite end of the trip lever is formed in the same manner as that above described and moves between opposing shoulders 117—117 of the valve stem which are provided in spaced relation by counterturning the valve stem. This trip lever is disposed through an opening 118 in the lower side of the cylinder and an opening 119 in the plate, and is mounted on a fulcrum pin 120 of the valve support plate 101.

To impart a snap or rapid action to the trip lever 114, a spring 121 under compression is mounted about a guide rod 122 between shoulder elements 123, 124 thereof, the inner end of the spring support rod being pivotally fixed in the trip lever adjacent its pivot as at 125 (see Figure 4) and the outer end of the rod being slidably disposed through a rock plate forming the shoulder 123 and seated in an aperture of a lug 126 of the plate. The pivoted inner end of the rod is related to the pivot of the trip lever so as to provide a dead center position toward either side of which the spring will compel a rapid action for oscillating the trip lever on its pivot.

As shown in the enlarged detail view of the drawings, the valve is in position cutting off the air supply. The power piston 44 has just completed a forward or grease ejecting stroke and by pressure on the adjacent end of the trip lever has caused the toggle means to swing the trip lever rapidly from a position holding the reversing valve in open position to a position maintaining it in closed position. The clearances or spacing between the shoulders 113—113 of the piston rod and the shoulders 117—117 of the valve stem permits a free swing of the trip lever when tripped and rapid valve closing action. The toggle spring 121 at this time in conjunction with the air tends to hold the valve in closed position.

As the return spring 50 moves the power piston in retractive movement, the opposite shoulder 113 of the plunger 13 engaged the trip lever slowly moving the toggle mechanism to dead center about the time that the return is fully accomplished. As dead center is reached, the trip lever snaps rapidly and its lower end swings against the outer shoulder 117 of the valve rapidly translating the same to close the exhaust passageway and to admit another charge of air to the power cylinder (see Figure 4). It is important to note that as the toggle is passing from one shoulder to the other, the valve is always maintained against the particular seat by the air pressure on the respective side. In other words, there is a time toward the limits of power piston stroke when there would be a chance for the valve to flutter and unseat for shortening the piston stroke. Normally the spring of the toggle through the medium of the trip lever maintains the valve in tightly seated condition but the air is active at all times for this purpose.

The pad or stock 20 of the gun may be engaged by the shoulder, the knee, the hip or any other part of the body which may be conveniently applied depending on the position of the fitting. This pad is moreover conveniently gripped in the hand for some work or for carrying the gun. After the operator has set the nozzle in abutment with the fitting, the gun can be held in place merely by leaning against the brace or applying body pressure. This is of especial value in the application of grease under high pressure since considerable weight can thus be thrown against the gun for establishing a butt connection which is effectively sealed, grease losses thus being materially reduced.

The body pressure to the brace is applied in axial alignment with the supply barrel and in parallelism and substantial alignment with the nozzle for a connection which is less apt to cause tipping or unsteady position of the gun. With the gun tight against the fitting in an efficient position for discharge the operator is then free to use both hands for other purposes. One hand or a finger of a hand is sufficient for manipulating the trigger and grease discharge control is effected without interference with the bracing of the gun against the fitting since the body pressure application is entirely independent of the control. The other hand may then be used for cleaning nipples, operating shaker bars on the springs etc.

The gun has a tapered discharge end since the nozzle 88 extends from the tapered end of the casting 11, the power cylinder extending back under the barrel at an acute angle relative to the barrel, the control handle being disposed under the barrel for balance. The nozzle 88 may be loosened for adjustment by turning the ferrule or union 90 and swinging the nozzle, this changing the angle of discharge since the nozzle is bent close to the attached end for normally substantially aligning the same with the barrel axis as its inner end is aligned with the high pressure chamber and piston. The ability to change the angle of the nozzle enables the operator to conveniently reach normally inaccessible fittings.

The operator can fill the gun by unscrewing the barrel from the casting 11, unscrewing the brace 20 from the quick threaded connection with the cylinder head 16 dipping the barrel in a drum of grease and pulling back on the brace drawing the piston 14 back with the rod 15 due to the stop 17 engaging the piston, thus drawing the grease into the barrel forward end whereupon the rod can be slid through the piston 14 and the brace screwed into the head at the time the gun is full. The brace and rod are thus set against displacement during gun use and the brace is not in the way since it is set close up to the gun. On the other hand, the gun may be filled through the filling valve 35.

The air for low pressure grease feeding is introduced into the cylinder at the back of the piston by way of the air valve 24 and the line connection 55 thereto. The hose is manually held in place on this valve and when released is hooked onto the nipple of the handle 51 for air supply to the power piston.

The brace or pad 20 is readily rotatable due to the screw threaded connection to the cylinder head thus enabling the operator to swivel the pad for ease in placing the body against the same dependent on the angle at which the gun is being applied.

Having described my invention, I claim:

1. In a lubricator, a barrel for containing grease, a grease discharge means acting toward the forward end of said barrel, a discharge nozzle extended rigidly and substantially axially from said barrel, a stock for said barrel disposed for applying body pressure axially thereon for butting said nozzle against a fitting, and a control trigger for said grease discharge means located beneath the barrel at a point remote from said stock and operable independently of the application of pressure on said stock.

2. In a grease gun, a barrel, a grease ejecting means in said barrel, a rigid discharge nozzle adjustably mounted on said barrel, and a shoulder pad at the rear of said barrel for applying pressure axially of the barrel and butting the nozzle against a fitting, said nozzle adjustably mounted for varying its angular position relative to the barrel axis.

3. A grease discharge device, comprising a grease supply barrel, grease feeding means therein, a grease discharge cylinder supplied from said barrel, grease discharge means in said cylinder, a discharge nozzle rigidly connected to the forward end of said grease discharge cylinder, a power device for the grease discharge means, a pressure application pad mounted on the barrel and having a relatively flat contact surface and disposed for the application of body pressure on the barrel in substantial alignment with the gun nozzle, said grease discharge cylinder disposed angularly and rearwardly beneath said barrel, and said grease discharge means disposed for operation toward the intersection of the supply barrel and discharge cylinder.

4. In a grease gun, a lubricant supply barrel, a power operated grease discharge means associated with the barrel including an ejecting piston, a nozzle extending from the discharge end of the barrel, said power operated grease ejector means extending angularly adjacent the barrel, a control handle for said grease ejector means disposed adjacent the barrel, and a shoulder pad disposed at the rear end of the barrel and adapted to be engaged by the body of the operator for applying pressure to the barrel for butting the nozzle against a fitting with the force applied in substantial alignment with the nozzle.

5. In a high pressure grease gun, a lubricant supply barrel, a follower piston in said barrel, inlet means for introducing air pressure to said barrel at the rear of said piston, an air operated grease discharge piston associated with the barrel, an air motor for said piston, a nozzle extending from the discharge end of the barrel, said air motor extending beneath the barrel, a control hand grip and trigger for said air motor disposed beneath the barrel, an air supply inlet for said air motor, an air hose adapted to be coupled to said barrel inlet means or said air motor inlet, and a shoulder pad disposed at the rear end of the barrel and adapted to be engaged for imparting body pressure to the gun for butting the nozzle against a fitting.

6. In a grease gun, a supply cylinder, a follower piston in said cylinder, a rod extended axially and loosely through said piston, said rod supported in the cylinder head of the cylinder and in the piston and including a stop collar on its inner end, a nozzle at the discharge end of the barrel, and a brace on the end of the rod beyond said barrel for exerting body pressure on the barrel and nozzle for butting the nozzle against a fitting, said brace screwed into fixed position in said cylinder head.

7. In a grease gun, a supply cylinder, a follower piston in said cylinder, a nozzle extended from the discharge end of the cylinder, a brace screwed into the head of the cylinder and adapted to be engaged by the operator for applying body pressure to the cylinder and substantially axially of the nozzle for butting the nozzle against a fitting, and a connection between said piston and said brace whereby the piston may be drawn back by means of the brace.

8. In a grease gun, a barrel, a grease ejecting means in said barrel, a discharge nozzle adjustably mounted on said barrel, and a shoulder pad at the rear of said barrel for applying pressure axially of the barrel and butting the nozzle against a fitting, said nozzle bent and rotatably mounted whereby rotation thereof changes the degree of its angular relation to the barrel axis.

9. A grease discharge device, comprising a grease supply barrel, grease feeding means therein, a grease discharge cylinder supplied from said barrel, grease discharge means in said cylinder, a discharge nozzle, a power device for the grease discharge means, said grease discharge cylinder disposed angularly and rearwardly beneath said barrel, said grease discharge means disposed for operation toward the intersection of the supply barrel and discharge cylinder, and control means on said grease discharge cylinder.

10. In a grease gun, a supply barrel, means for forcing grease in said barrel toward the forward end thereof, a grease ejecting piston acting in the forward end of said barrel, said piston disposed angularly relative to the axis of said barrel, and an angular discharge nozzle rotatably mounted on said barrel on the axis of said grease ejecting piston whereby said nozzle can be rotated for varying the degree of its angular position relative to the barrel axis.

CLEO HARRIS.